(No Model.)

U. G. JOHNSON.
WATER CLOSET SEAT.

No. 522,163.  Patented June 26, 1894.

Witnesses.
Wm. M. Rheem.
Wm. J. Henning

Inventor.
by Ulysses G. Johnson
Chas. G. Page
Atty.

UNITED STATES PATENT OFFICE.

ULYSSES G. JOHNSON, OF CHICAGO, ILLINOIS.

WATER-CLOSET SEAT.

SPECIFICATION forming part of Letters Patent No. 522,163, dated June 26, 1894.

Application filed November 7, 1893. Serial No. 490,267. (No model.)

*To all whom it may concern:*

Be it known that I, ULYSSES G. JOHNSON, a citizen of the United States, residing at Chicago, in the county of Cook and State of Illinois, have invented a certain new and useful Improvement in Water-Closet Seats, of which the following is a specification.

My invention relates to water-closet seats which can be converted from a seat having an opening of large area, to a seat having an opening of small area, or the converse, as may be desired, in which way the seat can be conveniently used by both adults and small children.

In carrying out my invention I provide in conjunction with a seat having an opening of ordinary or usual area, an upper supplemental seat having an opening of sufficiently small area to adapt it for children's use, and hinge the said supplemental seat between the lower seat and a hinged cover so that when it is desired to use the main or lower seat, having an opening of large area, the upper seat having an opening of smaller area together with the cover, can be swung back, so as to be out of the way, while on the other hand, the cover can be swung back independently of the said supplemental seat, whereby the latter can rest upon the lower seat and thus adapt the closet for the use of a small child.

As a matter of further improvement I recess the under side of the cover so as to adapt it for the reception of the supplemental seat and in conjunction therewith, I provide any suitable latch or locking device for temporarily securing the supplemental seat within the recess in the cover, in which way, when the supplemental seat is locked within the recess in the cover, and the latter is swung back, the whole will present a new and finished appearance.

In the accompanying drawings,—Figure 1 represents in elevation, the cover swung back with the supplemental seat in position for use on the lower main seat. Fig. 2 is a top plan view of Fig. 1. Fig. 3 is a section through Fig. 2 on line 3—3. Fig. 4 is a bottom plan view of a part of the cover with the corner portion thereof in section so as to show an arrangement of spring latch which can be conveniently employed for temporarily locking the supplemental seat within the recess in the cover.

A, indicates the main or lower seat hinged at $a$ as usual and provided with an opening of ordinary area, said opening being indicated by dotted lines $a'$.

B, indicates the supplemental seat provided with an opening $b$ of less area than the opening of the lower seat and understood to be of a size suitable to adapt the supplemental seat for children's use.

C, indicates the cover which is hinged at $c$, so that it can be swung back as in Fig. 1. The cover is provided with a recess $c'$ which adapts it to receve the supplemental seat B as illustrated in Fig. 3 wherein the supplemental seat is shown within the recess in the said cover.

While I may employ any suitable latching or locking device for temporarily securing the supplemental seat within the cover, I have shown a spring latch D arranged within a recess $d$, in one of the corner portions of the cover and have provided the supplemental seat with a socket $d'$ within which the catch portion of said latch may engage when the supplemental seat is closed within the cover.

In order to permit the cover to be swung back independently of the supplemental seat as in Fig. 1, the hinges E, for the supplemental seat are conveniently attached to the under side of the supplemental seat and to the rear edge portions of the cover, and are formed with leaves $e$, which are intermediate with the supplemental seat and cover so that when the supplemental seat and cover are locked together, the seat leaves will lie flat against the rear under side portions of the cover as in Fig. 3 and on the other hand, bridge the space between the said seat and cover when the former is down and the latter swung back as in Fig 1.

What I claim as my invention is—

A water-closet seat comprising a cover having a recess in its under side, a supplemental seat adapted to fit within said recess and having an opening of comparatively small area, a lower seat having an opening of comparatively large area, and hinges attached to the under side of the supplemental seat and to the rear edge portion of the cover and formed with leaves arranged intermediate of the supplemental seat and cover, whereby when the supplemental seat and cover are locked together, the said leaves will lie flat against the rear under side portions of the cover, and when the said seat is down and the cover raised, the leaves will bridge the space between the said seat and cover, substantially as described.

ULYSSES G. JOHNSON.

Witnesses:
 CHAS. G. PAGE,
 RETA M. WAGNER.